US00RE42388E

(19) United States
(12) Reissued Patent
Summers

(10) Patent Number: US RE42,388 E
(45) Date of Reissued Patent: May 24, 2011

(54) AIR FOLDER ADJUSTER APPARATUS AND METHOD

(76) Inventor: Scott Summers, Austin, TX (US)

(21) Appl. No.: 11/153,885

(22) Filed: Jun. 14, 2005

Related U.S. Patent Documents

Reissue of:
(64) Patent No.: 6,840,616
Issued: Jan. 11, 2005
Appl. No.: 10/108,288
Filed: Mar. 27, 2002

U.S. Applications:
(60) Provisional application No. 60/279,926, filed on Mar. 29, 2001.

(51) Int. Cl.
*B41J 2/01* (2006.01)
*B31F 1/00* (2006.01)
*B31F 7/00* (2006.01)
*B31F 1/10* (2006.01)
*B42C 1/00* (2006.01)

(52) U.S. Cl. ..... 347/104; 347/101; 101/37; 101/38.1; 101/97; 101/40; 101/232; 270/20.1; 270/46; 270/19; 270/12; 270/15; 493/418; 493/450; 493/444

(58) Field of Classification Search ..... 347/101, 347/104; 101/37, 38.1, 40, 97, 232; 270/20.1, 270/46, 19, 12, 15; 493/18, 418, 450, 457, 493/444, 416, 427, 435, 442
See application file for complete search history.

(56) References Cited

U.S. PATENT DOCUMENTS 2,699,331 A * 1/1955 McGarvey et al. ..... 493/421
3,632,104 A * 1/1972 Dufour ..... 493/444
3,753,331 A * 8/1973 Sato ..... 53/526
3,773,315 A * 11/1973 Tsien ..... 493/443
3,785,636 A * 1/1974 Bitting et al. ..... 493/418
3,797,371 A * 3/1974 Randle ..... 493/295
3,835,646 A * 9/1974 Ranft et al. ..... 60/290
3,843,113 A * 10/1974 Schaffer ..... 493/357
3,918,698 A * 11/1975 Coast ..... 493/442
3,926,425 A * 12/1975 Pierce et al. ..... 493/444
3,927,875 A * 12/1975 Winnemoller et al. ..... 493/413
3,952,651 A * 4/1976 Bolza-Schunemann ..... 101/242
4,053,150 A * 10/1977 Lane ..... 493/417
4,419,088 A * 12/1983 Nemec ..... 493/444
4,500,244 A * 2/1985 Sardella et al. ..... 414/794.9
4,524,962 A * 6/1985 Davenport et al. ..... 270/21.1
4,549,728 A * 10/1985 Odeau ..... 270/46

(Continued)

FOREIGN PATENT DOCUMENTS

JP 61233552 * 10/1986

(Continued)

*Primary Examiner* — Stephen D Meier
*Assistant Examiner* — Leonard S Liang
(74) *Attorney, Agent, or Firm* — J. Nevin Shaffer, Jr.

(57) ABSTRACT

An air folder adjuster (10) includes an air supply (12) and air supply tubing (14) connected to air supply (12) at end (16). The opposite end (18) of air supply tubing (14) is connected to one or more air nozzles (20). In a printing press utilized for folding documents such as books, air folder adjuster (10) is positioned so that air nozzles (20) direct compressed air from air supply (12) downward onto the head (26) of document (24) on either side of chopper arm (34) during the folding process thus ensuring that the document (24) lies flat, square, and untouched during the folding process and thereby allowing the elimination of chopper brushes altogether.

16 Claims, 1 Drawing Sheet

U.S. PATENT DOCUMENTS

| | | | | | |
|---|---|---|---|---|---|
| 4,831,926 | A | * | 5/1989 | Bowman et al. | 101/138 |
| 4,852,487 | A | * | 8/1989 | Stienstra | 101/232 |
| 4,921,235 | A | * | 5/1990 | Biagiotti et al. | 270/47 |
| 5,036,737 | A | * | 8/1991 | Glaser | 83/100 |
| 5,094,658 | A | * | 3/1992 | Smithe et al. | 493/248 |
| 5,405,127 | A | * | 4/1995 | Welborn | 270/21.1 |
| 5,443,250 | A | * | 8/1995 | Gosslinghoff | 270/52.23 |
| 5,706,726 | A | * | 1/1998 | Stephan | 101/232 |
| 5,779,232 | A | * | 7/1998 | Ochsner | 270/45 |
| 5,791,247 | A | * | 8/1998 | Kolb | 101/232 |
| 5,937,757 | A | * | 8/1999 | Jackson et al. | 101/232 |
| 6,070,391 | A | * | 6/2000 | Honegger | 53/411 |
| 6,257,142 | B1 | * | 7/2001 | Baba | 101/480 |
| 6,308,620 | B1 | * | 10/2001 | Wadlinger et al. | 101/183 |
| 6,435,088 | B2 | * | 8/2002 | Fujimoto | 101/232 |
| 6,551,228 | B1 | * | 4/2003 | Richards | 493/417 |
| 6,840,616 | B2 | * | 1/2005 | Summers | 347/104 |

FOREIGN PATENT DOCUMENTS

| | | | | |
|---|---|---|---|---|
| JP | 05186141 | A | * | 7/1993 |

* cited by examiner

AIR FOLDER ADJUSTER APPARATUS AND METHOD

Matter enclosed in heavy brackets [ ] appears in the original patent but forms no part of this reissue specification; matter printed in italics indicates the additions made by reissue.

CROSS-REFERENCE TO RELATED APPLICATION

This application is related to U.S. provisional patent application Ser. No. 60/279,926, filed Mar. 29, 2001 and entitled "AIR FOLDER ADJUSTER APPARATUS AND METHOD." The Applicants hereby claim the benefit of this provisional patent application under 35 U.S.C. §119(e). The entire content of this provisional application is incorporated herein by this reference.

TECHNICAL FIELD

This invention generally relates to the printing industry and to devices used to fold printed materials In particular, this invention relates to an air folder adjuster apparatus and method for use in the printing industry.

BACKGROUND

The devices needed to create folded documents, books, pamphlets, magazines and the like, are both technologically complex and difficult to adjust precisely. As a result, head tears, dog ears, foot tears, head stop damage, and crooked folds are commonplace in the printing industry. Currently, chopper brushes are used to smooth documents prior to folding in an effort to prevent damage. These chopper brushes are attached to extended arms which include a wide variety of adjustments, such as side adjustments, height adjustments, and angle adjustments, for example. After much effort and experimentation, it is possible to obtain satisfactory results with the use of these chopper brushes. Nonetheless, any change in the type of document to be created, stock, thickness, or the like, or simply the passage of time sends the user back to the drawing board for more adjustments.

Thus there is a need in the art for a simple to use, add on device for prior art printing systems that helps eliminate the need for constant adjustments and that, therefore, reduces downtime and increases profits while producing a superior folded product.

SUMMARY

Accordingly, the air folder adjuster apparatus and method of the present invention includes, in a printing system for creating folded documents, an air supply. The air supply is connected to an air supply regulator. Air supply tubing with two ends, with one end connected to the air supply regulator, is provided. At least one directional air nozzle is connected to the other end of the air supply tubing.

In another aspect of the invention, a remote head stop air stand is provided wherein the second end of the air supply tubing is connected to the remote head stop air stand and the at least one directional air nozzle is also connected to the remote head stop air stand. In a further aspect of the invention, the remote head stop air stand is movably connected to the printing system. In another aspect of the invention, two pairs of air nozzles are provided. In a further aspect of the invention, a pair of remote head stop air stands are provided along with two pairs of air supply tubing, with a total of four second ends. Two second ends are connected to each one of the pair of remote head stop air stands and two second ends are connected to one of two directional air nozzles connected to each one of the pair of the remote head stop air stands.

In another aspect of the invention, wherein the printing system includes a pair of folding rollers and a chopper arm, two pairs of air nozzles are conformed to direct air downward on either side of the chopper arm towards the folding rollers. In another aspect of the invention, the directional air nozzle(s) is movable.

In a further aspect of the invention, the air flow regulator includes a control stand and an air flow control valve, with an inlet end an outlet end, connected to control stand. The air supply is connected to the inlet end and the air supply tubing is connected to the outlet end. Further, an air flow control handle is connected to the air flow control valve for controlling the amount of air flowing through the air flow control valve.

In a further aspect of the invention, the air flow supply supplies air in the range of 0 to 100 pounds Per Cubic Inch (PCI) and the air flow regulator delivers air in an adjustable range from 0 to 100 pounds PCI.

In another embodiment of the invention, in a printing system for creating folded documents including a head stop, a pair of folding rollers and a chopper arm, an air folder adjuster apparatus includes an air supply and a control stand. At least one air control valve, with an inlet end and an outlet end, is connected to the control stand and the air supply is connected to the inlet end of the at least one air control valve. An air flow control handle is connected to the air flow control valve for controlling the amount of the air flowing through the air flow control valve. Air supply tubing with two ends is provided, with one end connected to the outlet end of the air control valve. A remote head stop air stand is connected to the head stop and to the second end of the air supply tubing. At least two air nozzles are connected to the remote head stop air stand and are conformed to direct air downward on either side of the chopper and toward the folding rollers.

In another aspect of the invention, two air control valves are provided along with two remote head stop air stands. Additionally, two pairs of air nozzles, one pair connected to each remote head stop air stand, are provided such that one pair of air nozzles is conformed to direct air onto a document with a center and far corners so that the air is directed to the far corners of the document.

In a further aspect of the invention, the remote head stop air stands are movably attached to the head stop. In another aspect of the invention, the at least two directional air nozzles are also movable. In a further aspect of the invention, the air flow supply supplies air in the range of 0 to 100 pounds PCI and the at least one air flow control valve delivers air in an adjustable range of from 5 to 80 pounds PCI.

In another embodiment, in a printing system for creating folded documents including a head stop, a pair of folding rollers and a chopper arm, an air folder adjuster method is provided including the steps of providing an air supply and a control stand. At least one air control valve, with an inlet end and an outlet end, is connected to the control stand. The air supply is connected to the inlet end of the air control valve. An air flow control handle is connected to the air flow control valve for controlling the amount of air flowing through the air flow control valve. Air supply tubing, with two ends, is provided with one end of the air supply tubing connected to the outlet end of the at least one air control valve. A remote head stop air stand is connected to the head stop. The second end of the air supply tubing is connected to the remote head stop air stand. Finally, at least two air nozzles are connected to the remote head stop air stand and are conformed so that the nozzles direct air downward on either side of the chopper arm toward the folding rollers.

In another aspect of the method of the invention, two air control valves are provided along with two remote head stop air stands. In this embodiment, two pairs of air nozzles are provided, one pair connected to each remote head stop air stand. Additionally, in this embodiment, one pair of air nozzles is conformed to direct air on a document with a center and far corners such that air is directed to the far corners of the document.

In another aspect of the invention, the remote head stop air stand is movably connected to the head stop. In another aspect of the invention, at least two movable air nozzles are provided. Finally, in another aspect of the invention, air flow is supplied in the range of 0 to 100 pounds PCI and the air flow control valve delivers air in an adjustable range of from 5 to 80 pounds PCI.

BRIEF DESCRIPTION OF THE DRAWINGS

Other objects, features and advantages of the present invention will become more fully apparent from the following detailed description of the preferred embodiment, the appended claims and the accompanying drawings in which:

DETAILED DESCRIPTION

Figure 1:
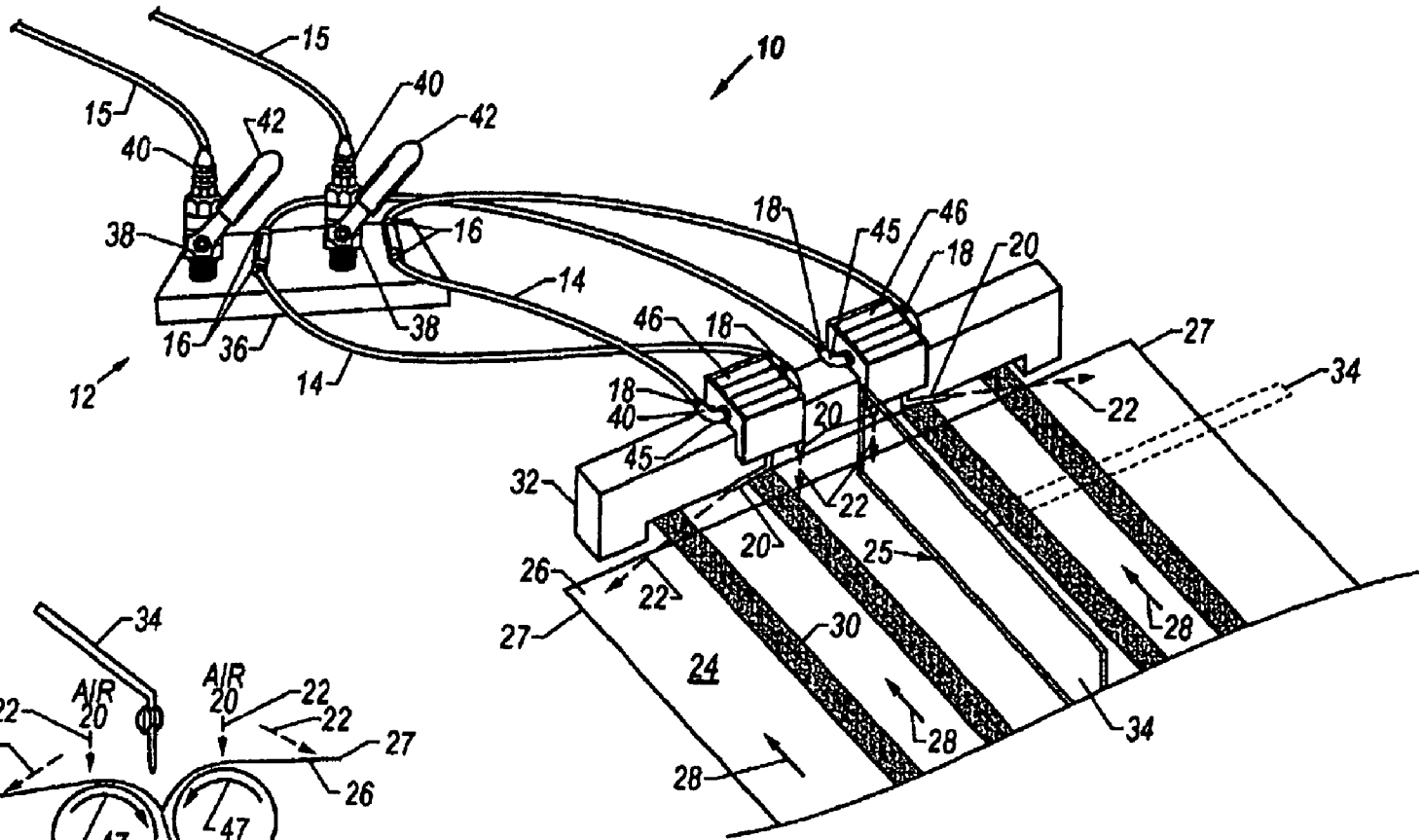
FIG. 1 is a schematic diagram illustrating the air folder adjuster of the present invention.
Figure 2:
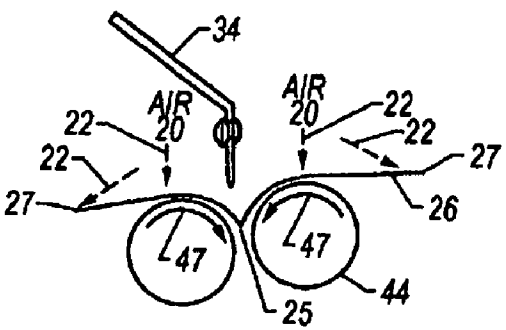
FIG. 2 is a side view of the invention of FIG. 1.

The air folder adjuster of the present invention is illustrated by way of example in FIGS. 1 and 2. With specific reference to FIG. 1, the air folder adjuster 10 includes air supply 12 and air supply tubing 14 connected at end 16 to the air supply 12. The opposite end of air supply tubing 14, end 18, is connected to one or more air nozzles 20. Air nozzles 20 direct air in the direction of arrows 22 onto document 24. The head 26 of document 24 is moved in the direction of arrows 28 by belts 30 until document 24 comes to a stop at head stop 32 and is folded by chopper arm 34. Document 24 includes a center 25 and far corners 27.

Air supply 12 may be any air supply system known in the art for providing pressurized air, such as a common air compressor. In this invention air supply 12 includes control stand 36 and air flow control valves 38. The remote compressed air supply 12 source (not shown) is connected by air supply tubing 15 to the inlet end 40 of air flow control valves 38. Applicant has determined that compressed air flow in the range of 0 to 100 PCI delivered to the air control valves 38 enables an adjustable air flow of 0 to 100 PCI with a preferred adjustable range of about 5 to 80 pounds PCI which has been found to be appropriate for the purposes of the invention. Air flow control valves 38 include handles 42 for adjusting air flow delivered to nozzles 20. Air flow control valves 38 are of any type now known or hereafter developed as are air control handles 42. The important feature of enabling a user to adjust the amount of air delivered by the air nozzles 20 may be implemented in many ways within the ability of those of ordinary skill in the art.

In combination, an air flow regulator of the invention includes control stand 36, air flow control valves 38 and air flow control handles 42. Air compressors known in the art also have regulators that may be sufficient for the purposes of the invention and any air flow regulator now known or hereafter developed will suffice.

As illustrated in FIG. 1, in a preferred embodiment, four air nozzles 20 are provided. Two air nozzles 20 direct air down on document 24 toward folding rollers 44 on either side of chopper arm 34 at the head 26 of document 24. Additionally, in a preferred embodiment, two air nozzles 20 direct air toward the far corners 27 of the head 26 of document 24 as shown by the directional arrows 22. Certainly, any number of nozzles 20 may be provided as a user deems necessary to accomplish the purposes of the invention with regard to individual presses encountered in the field.

Referring now to FIG. 2, a side view of the air folder adjuster 10 of the present invention is shown schematically. Underneath document 24, a pair of folding rollers 44 turn in the direction of arrows 47 and complete the folding process started by chopper arm 34. In this embodiment, air folder adjuster 10 directs air in the direction of arrows 22 from nozzles 20 at four locations: both far corners 27 and on either side of the chopper arm 34 downward towards folding rollers 44.

By way of further explanation, the air folder adjuster apparatus and method 10 of the present invention is designed to apply air, in a preferred embodiment, at four specific points to document 24 as just described. Obviously, any other gas other than air, such as any other suitable compressed gas, may be used. Also, in a preferred embodiment, air is delivered to nozzles 20 by plastic tubing 14 and nozzles 20 are made of copper. Any other suitable materials capable of accomplishing the objectives of the invention are well within the ability of those of ordinary skill in the art.

Further, compressed air, or "house air," is attached to air flow control valves 38. The air flow control valves 38 control the air pressure through the plastic tubing 14 leading to the nozzles 20. In a preferred embodiment, control is provided by manually actuated air flow control handles 42. Obviously, handles 42 may be electronically remotely manipulable as well.

In a preferred embodiment, a pair of remote head stop air stands 46 are provided. Remote head stop air stands 46 are removably attachable to head stop 32. Once attached, in a preferred embodiment, they can be moved left or right along head stop 32 for gross adjustment of air pressure location. Once in the correct place they may be temporarily secured there by any means known in the art, such as a set screw, not shown, for example. Two pairs of air nozzles 20, in a preferred embodiment, are attached, one pair each, to each remote head stop air stand 46. Once the remote head stop air stands 46 are located in the general area for proper performance, air nozzles 20, in a preferred embodiment are flexible and may be adjusted manually, i.e., bent or angled, for precise location of air flow.

Again, by way of further explanation, remote head stop air stands 46 may be of cast aluminum, for example. Air passages in the aluminum block allow air to flow from the connection on the outside of remote head stop air stand 46 to the air nozzles 20, also connected to air stand 46. Air nozzles may be screwed into air stand 46 or bolted or attached in any other appropriate manner.

Remote head stop air stands 46 include inlet ends 40 to receive end 18 of flexible tubing 14. Again, remote head stop air stands 46 are drilled, cast or the like to provide air passages from inlet ends 40 to air nozzles 20. As illustrated in FIG. 1, each of the two remote head stop air stands 46 has two connections for ends 18 of tubing 14. One end 18 is connected to the inlet end 40 of an extension, nipple, 45 connected to air stand 46. Extension 45 directs air internally (not shown) through air stand 46 to air nozzles 20 as shown. In another embodiment, one pair of ends 18 is connected directly to the inlet end 40 of nozzle 20 attached to the side of air stand 46. This reduces the amount of internal passageways needed in air stand 46.

Once the invention is in position, air is applied to four specific points on the document 24 as described above. This forces the document 24 to lie flat, square, and untouched during the folding process. Air flow handles 42 allow easy adjustment of the air flow as needed and, again, may be replaced with automatic valves so that the flow of air is controlled electronically. Also, the applicant has determined that continuous air flow is not always required and that an interrupted series of small bursts of air also serve the purpose of the invention for various types of document folding jobs In summary, applicant's invention allows the chopper-fold printing machinery known in the art to run consistently without interruption from fast speeds to slow speeds. Importantly, all chopper brushes, and many other parts and pieces of machinery which are currently required on most standard presses and which physically contact the document 24, are eliminated completely. In the end, applicant's invention is a significant improvement over the prior art and yields impressive savings in time and cost in the printing industry.

The description of the present embodiments of the invention have been presented for purposes of illustration but are not intended to be exhaustive or to limit the invention to the form disclosed. Many modifications and variations will be apparent to those of ordinary skill in the art. As such, while the present invention has been disclosed in connection with the preferred embodiment thereof, it should be understood that there may be other embodiments which fall within the spirit and scope of the invention as defined by the following claims.

What is claimed is:

1. A printing system for creating folded documents from a document with a leading end, a middle, and a trailing end, including an air folder adjuster apparatus, the apparatus comprising:

a) an air supply;

b) an air supply regulator connected to said air supply;

c) air supply tubing [with two ends, with one end] connected to said air supply regulator;

d) [at least one directional air nozzle connected to the other end of said air supply tubing] *a pair of remote head stop air stands connected with said air supply regulator wherein each remote head stop air stand includes a pair of directional air nozzles*; and e) a [remote] head stop [air stand] wherein said [second end of said air supply tubing is connected to said remote head stop air stand and said at least one directional air nozzle is also connected to said remote head stop air stand and wherein said remote head stop air stand is moveably connected to said printing system such that said at least one directional air nozzle is] *pair of remote head stop air stands are connected with said head stop and said directional air nozzles are* directed down [from the printing system] at the leading end of the document[, wherein the leading end of the document is at the head stop,] and in the direction of an approximate longitudinal center of at least one of a pair of folding rollers *wherein the leading end of the document is at the head stop*.

[2. The apparatus of claim 1 wherein the apparatus comprises two pairs of air nozzles.]

[3. The apparatus of claim 2 further comprising a pair of remote head stop air stands and two pairs of air supply tubing with four second ends, with two second ends connected to each one of said pair of said remote head stop air stands and two second ends connected to one of two directional air nozzles connected to each one of said pair of said remote head stop air stands.]

4. The apparatus of [claim 2] *claim 1* wherein said printing system includes a pair of folding rollers and a chopper arm and said two pairs of *directional* air nozzles are conformed to direct air downward on either side of said chopper arm toward an approximate longitudinal center of each of said folding rollers.

5. The apparatus of claim 4 wherein said two pairs of *directional* air nozzles are also conformed to direct air on a document with a leading end with a center and far corners such that air is directed in opposite directions from near the center of the document along said leading end of the document to said far corners of said document.

6. The apparatus of claim 1 wherein said [at least one directional air nozzle is] *two pairs of directional air nozzles are* movable.

7. The apparatus of claim 1 wherein said air flow regulator further comprises:

a) a control stand;

b) an air flow control valve with an inlet end and outlet end connected to said control stand wherein said air supply is connected to said inlet end and said first end of said air supply tubing is connected to said outlet end; and c) an air flow control handle is connected to said air flow control valve for controlling the amount of air flowing through said air flow control valve.

8. The apparatus of claim 1 wherein said air flow supply supplies air in the range of 0 to 100 pounds per square inch and said air flow regulator delivers air in an adjustable range from 0 to 100 pounds per square inch.

9. A printing system for creating folded documents from a document with a leading end, a middle, and a trailing end, the printing system including a head stop, a pair of folding rollers and a chopper arm, and an air folder adjuster apparatus, the apparatus comprising:

a) an air supply;

b) a control stand;

c) at least one air control valve, with an inlet end and an outlet end, connected to the control stand wherein the air supply is connected to the inlet end of the at least one air control valve;

d) an air flow control handle connected to the air flow control valve for controlling the amount of air flowing through the air flow control valve;

e) air supply tubing with two ends, with one end connected to the outlet end of the air control valve;

f) a remote head stop air stand connected to the head stop and to the second end of the air supply tubing; and g) at least two air nozzles connected to the remote head stop air stand directed downward from said head stop at the leading end of the document, wherein the leading end of the document is at the head stop, and on either side of said chopper arm toward an approximate longitudinal center of each of the folding rollers.

10. The apparatus of claim 9 further comprising:

a) two air control valves;

b) two remote head stop air stands; and c) two pairs of air nozzles, one pair connected to each remote head stop air stand, wherein one pair of air nozzles is directed in opposite directions from near the center of the document along said leading end of the document toward the far corners of the document.

11. The apparatus of claim 9 wherein the remote head stop air stands are moveably attached to the head stop.

12. The apparatus of claim 9 wherein the at least two directional air nozzles are movable.

13. The apparatus of claim 9 wherein the air flow supply supplies air in the range of 0 to 100 pounds per square inch and the at least one air flow control valve delivers air in an adjustable range from 5 to 80 pounds per square inch.

14. A printing system for creating folded documents from a document with a leading end, a middle, and a trailing end, the printing system including a head stop, a pair of folding rollers and a chopper arm, and an air folder adjuster method, the method comprising the steps of:

a) providing an air supply;

b) providing a control stand;

c) connecting at least one air control valve, with an inlet end and an outlet end, to the control stand;

d) connecting the air supply to the inlet end of the air control valve;

e) connecting an air flow control handle to the air flow control valve for controlling the amount of air flowing through the air flow control valve;

f) providing air supply tubing with two ends and connecting one end of the air supply tubing to the outlet end of the at least one air control valve;

g) connecting a remote head stop air stand to the head stop;

h) connecting the second end of the air supply tubing to the remote head stop air stand; and i) connecting at least two air nozzles to the remote head stop air stand and directing the nozzles downward from said head stop at the leading end of the document, wherein the leading end of the document is at the head stop, and on either side of the chopper arm toward an approximate longitudinal center of each of the folding rollers.

15. The method of claim 14 further comprising the steps of:

a) providing two air control valves;

b) providing two remote head stop air stands; and c) providing two pairs of air nozzles, one pair connected to each remote head stop air stand and wherein one pair of air nozzles to is directed in opposite directions from near the center of the document, with a leading end, center and far corners, along said leading end of the document toward the far corners of the document.

16. The method of claim 14 wherein step g) includes moveably connecting the remote head stop air stand to the head stop.

17. The method of claim 14 wherein step i) includes providing at least two moveable air nozzles.

18. The method of claim 14 wherein step a) includes providing an air flow that supplies air in the range of 0 to 100 pounds per square inch and wherein the air flow control valve delivers air in an adjustable range of from 5 to 80 pounds per square inch.

* * * * *